Figure 4:
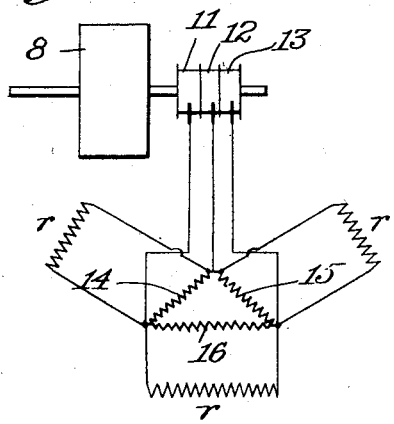
Figure 5:
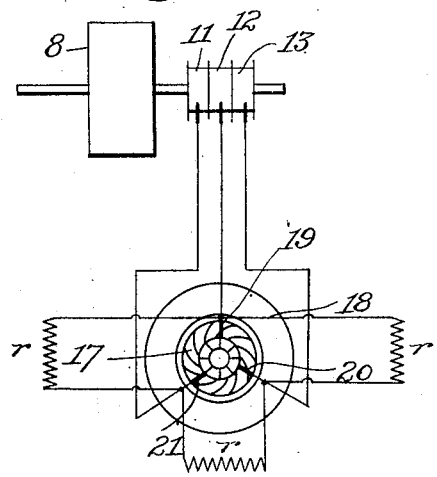

No. 890,776. PATENTED JUNE 16, 1908.
M. LEBLANC.
DAMPER FOR THE UPPER HARMONICS OF ALTERNATING ELECTRIC CURRENTS.
APPLICATION FILED APR. 28, 1905.
2 SHEETS—SHEET 1
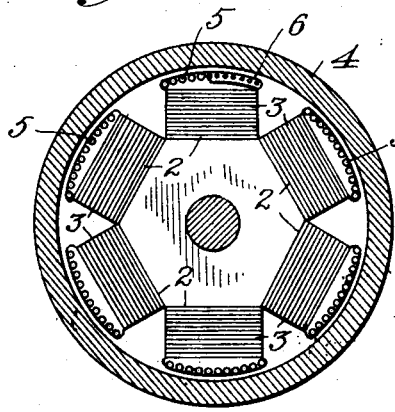
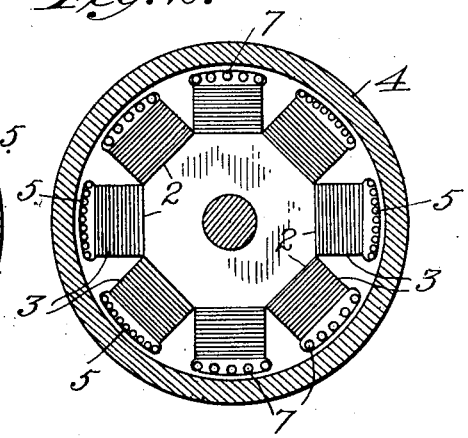
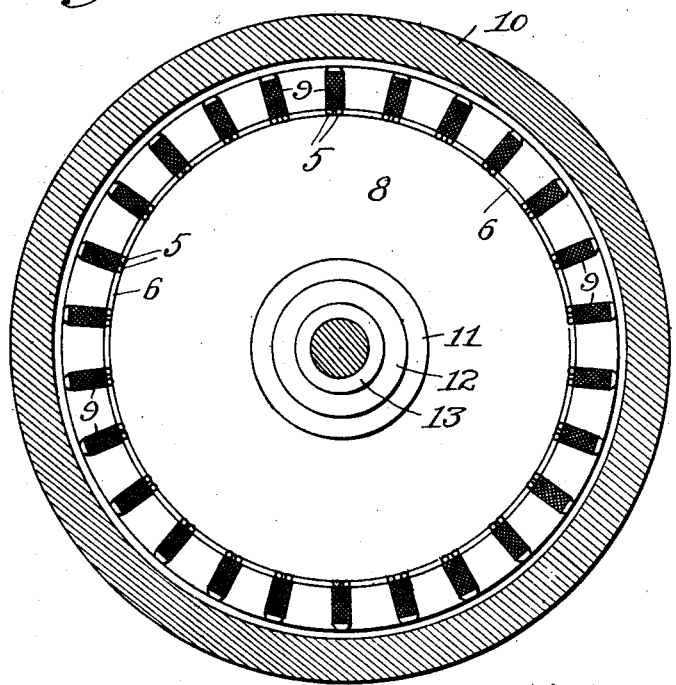

No. 890,776. PATENTED JUNE 16, 1908.
M. LEBLANC.
DAMPER FOR THE UPPER HARMONICS OF ALTERNATING ELECTRIC CURRENTS.
APPLICATION FILED APR. 28, 1905.

2 SHEETS—SHEET 2.

Witnesses
Edwin L. Yewell
C. E. Marshall

Inventor
Maurice Leblanc
By Lyons Bissing
Attorney

UNITED STATES PATENT OFFICE.

MAURICE LEBLANC, OF PARIS, FRANCE, ASSIGNOR TO WESTINGHOUSE ELECTRIC AND MANUFACTURING COMPANY, A CORPORATION OF PENNSYLVANIA.

DAMPER FOR THE UPPER HARMONICS OF ALTERNATING ELECTRIC CURRENTS.

No. 890,776.    Specification of Letters Patent.    Patented June 16, 1908.

Application filed April 28, 1905. Serial No. 257,897.

*To all whom it may concern:*

Be it known that I, MAURICE LEBLANC, a citizen of the Republic of France, and resident of Paris, in the Republic of France, have invented certain new and useful Improvements in Dampers for the Upper Harmonics of Alternating Electric Currents, of which the following is a specification.

My invention has reference to improvements in the transmission of electrical energy and it consists in an apparatus for preventing an undue or dangerous resonant rise of potential in alternating current transmission systems due to the capacity of the line and the self induction of the generators and motors installed in the system.

It is a well known fact that the alternating currents generated by any of the ordinary generators are not of the simple sinusoidal type, but are accompanied by currents of the odd upper harmonics, so that in any ordinary alternating current, if it be analyzed, there will be found in addition to the fundamental sinusoidal current also currents of the third, fifth, seventh, etc., upper harmonics.

In practice it has been found that the system of distribution is rarely, if ever, resonant to the frequency of the fundamental current, but that resonance to one or the other of the upper harmonics frequently occurs and that for different loads the resonance may change from one harmonic to another. In consequence of such resonance the potential rises frequently to a high and dangerous point and may become destructive of the machines.

It is easy, with the present knowledge of the art, to build alternating machines, by properly designing their pole pieces and by proper winding, so that such machines will not produce the third, fifth or seventh harmonic. By my invention I am able to effectively suppress the resonant rise of potential due to the ninth and higher harmonics which I designate as the upper harmonics. This is for the case of single phase machines. In the case of polyphase machines, I am enabled to effectively suppress the rise of tension due to the fifth and higher harmonics which, for polyphase machines, I also call upper harmonics. By all of which I mean that I can suppress the resonant rise of potential due to the upper harmonics without increasing injuriously the heat losses due to the funda-mental frequency. This I do by supplying to one or more of the alternating current generators or motors used in the system, circuits of very high resistance, preferably placed near the air gap, taking care that such high resistance circuits shall not be screened by low resistance circuits. While I prefer, as a matter of mechanical construction, to use high resistance circuits in the form of squirrel cages on the magnetic poles of the alternating current machine, I may reach the same result by placing high external resistances in circuit with the circuits of the machine. To prevent some circuit on the machine from screening the high-resistance harmonic-damper circuit, if the two be in inductive proximity, I may place an impedance coil therein which has an inductance which is low for the alternating currents of normal frequency and which is high for the currents of harmonic frequency which it is desired to suppress. I may, however, connect the circuits, which are not to act as screens, to an armature of the direct current type, and I drive the armature at a speed which causes the circuits to act as an obstruction for the high frequency harmonic currents, but to assist the low frequency currents.

In the accompanying drawing which forms a part of this specification some of the apparatus that may be used in the practice of my invention are illustrated as follows:

Figure 1 is a cross-section of an alternator provided with means for suppressing the rise of potential; Fig. 2 is a like view of an alternator provided with means for suppressing the resonant rise of potential and also with means for preventing the hunting of the machine; Fig. 3 is a like view of the essential parts of an induction motor provided with means for preventing a resonant rise of potential, and Figs. 4, 5, 6, 7 and 8, are diagrams illustrating different ways in which my invention may be practiced.

Like numerals and letters of reference indicate like parts in all figures of drawing.

Referring to Fig. 1, which represents a part of an alternator, 2, 2, etc. are the rotating field poles energized by direct current which is passed through its coils 3, in the ordinary well known manner. The ring 4 is intended to represent an ordinary stationary armature, in the windings of which the alternating currents are generated which go to line. On the polar extensions of the field poles are shown sectional squirrel cages composed of conductors 5 of high resistance, which pass through the polar extensions from side to side and are at their ends united by strips or cheek plates 6 of metal, in the usual manner of constructing squirrel cages. Instead of using a separate pair of cheek plates for each sectional squirrel-cage, two complete rings may be used, which would thus serve as the cheek plates for all pole pieces; such construction is indicated in Patent No. 529,272, granted jointly to M. Hutin and myself. The field structure must be laminated in order to prevent the generation of parasitic currents. The squirrel-cage rods must be of exceptionally high resistance, and they may for this purpose be made of thin copper or preferably of German silver, and they should be placed as near as possible to the air gap, so as to intercept as much as possible of the magnetic flux which is generated in the armature. The presence of these high resistance circuits near the air-gap operates to effectively suppress the rise of potential due to the upper harmonics of the fundamental current generated in the armature coils, and I therefore call these high resistance circuits dampers of harmonics or harmonic dampers.

An essential condition for obtaining the desired result is that the flux produced by the harmonics may intersect the high resistance harmonic damper circuit without traversing any circuit of low resistance closed upon itself. Such low resistance circuits closed upon themselves would act as a shield against the high speed fluxes developed by the harmonics and the action of which upon the damper circuits is necessary in order to obtain the result aimed at. For the same reason the harmonic damper circuits should never be applied to massive iron cores; they should always be applied to laminated cores, which cannot be the seat of Foucault currents capable of demagnetizing the cores perceptibly. Now the use of low resistance circuits closed upon themselves on the field poles of alternators and motors is of great advantage for the suppression of speed oscillations of such machines, as is explained in the United States patent granted to M. Hutin and myself #529,272, dated November 13th, 1894, and such circuits are now largely used for suppressing the hunting of alternating current machines. Therefore, in order to combine in one machine the benefits of anti-hunting (called deadener circuits) with the harmonic dampers hereinbefore described, the dampers must not be arranged on the same pole pieces with the deadeners; and such arrangement I have indicated in Fig. 2. In this alternator, which has eight poles, two adjacent pole pieces are provided with sectional squirrel cages of high resistance 5, 5; the two next pole pieces are provided with low resistance anti-hunting sectional squirrel cages 7, 7, and so forth, so that none of the high resistance harmonic dampers are screened by the low resistance deadeners.

In Fig. 3 my invention is shown as applied to an induction motor in which 8 represents supposed to be the field structure receiving the rotor and 10 the stator, the latter being in its windings the currents from the line. If the rotor or secondary member had a low resistance squirrel cage winding my invention would not be applicable to it, since the low resistance squirrel cage would act as a screen to any harmonic dampers of high resistance that could be applied. This induction motor therefore is provided with a coil winding 9, 9, . . . located in slots and connected to three collector rings 11, 12, 13, placed on the shaft of the machine, and on these rings bear brushes as indicated in Fig. 4, which are connected to inductance coils 14, 15, 16 outside of the machine. In the bottoms of the slots in which the windings 9 are placed are located the high resistance harmonic damper conductors 5, connected at each end by a cheek plate or ring 6. From the electrical point of view it would be preferable to place the harmonic damper conductors above the windings 9, so as to be closer to the air gap; but this construction would involve difficulties from a purely mechanical view. If the windings 9 of the armature were closed upon themselves within the machine, they would also serve as screens to the harmonic dampers, and this is the reason why the armature windings are closed outside the machine as indicated in Fig. 4. The coefficient of self induction of these coils 14, 15, 16, must be sufficiently low to permit the passage of currents of the slip frequency, which means the frequency of 2 at the utmost, but sufficiently large to offer a great impedance to the passage of currents of a frequency greater than the normal frequency of the line currents. In other words, these self induction coils exterior to the machine but in the circuits of the armature will themselves act in a manner to suppress the resonant rise of potential without acting as a screen to the damper circuits proper. The presence of these self-induction coils in ordinary induction motors diminishes the power factor and the maximum torque of the motor for a given voltage. This difficulty is overcome by the arrangement shown in Fig. 5, where the brushes bearing upon the collector rings 11, 12, 13, are connected with the commutator of an armature 17, of a direct current type, the field for which may be a simple laminated iron ring 18, and the armature 17 may be mounted on the shaft of the induction motor, or may be geared to it.

The currents which the rotor 17, receives develop in the same a rotary field which, with reference to the brushes, has a speed equal to the frequency of these currents. Now it is known that if the rotor turns slower than the field the circuits comprised between its brushes behave as if they had self induction; while when the rotor turns faster than the field the circuits comprised between the brushes behave like condensers. The useful currents which traverse the armature of the induction motor and which reach the armature of the direct current type have a very low frequency, the frequency of the slip; while the currents developed in the induction motor armature by the harmonics on the line have, on the contrary, a very high frequency. Under these conditions it will be easy to give to the rotor of the armature 17 such a speed that the circuits with which it is connected will behave as condensers for the useful currents and as self inductions for the harmonic currents. This arrangement will by itself act to a certain extent to suppress the rise of potential of the harmonics without operating as a screen to the action of the high resistance harmonic damper circuits, and without reducing either the power factor or the maximum torque of the machine for a given voltage. A further improvement in this respect may be obtained by placing between each pair of brushes 19, 20; 20, 21 and 21, 19, like very high resistances $r$ which have no self induction; and the like improvement can also be made in the arrangement shown in Fig. 4 by shunting each self induction coil 14, 15, 16, by a like very high resistance which is free of self induction.

Figure 6:
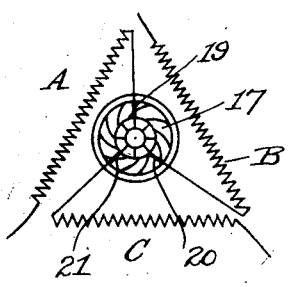
Figure 7:
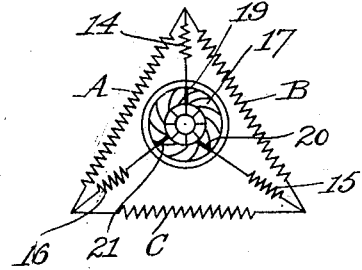

Another efficient arrangement is indicated in Fig. 6 in which case the winding of the direct current armature type 17 is supposed to be placed directly upon the rotor 8, which is provided with the high resistance harmonic dampers; and in this case the brushes 19, 20, 21, are connected with the stator windings A, B, C, of the machine. With this arrangement the self inductions of the stator windings will prevent the windings 17 from acting as a screen to the fluxes produced across the rotor by the passage of harmonic currents in the stator circuits. The same arrangement is also indicated in Fig. 7, but in addition thereto I have indicated self induction coils 14, 15, 16, in the circuits proceeding from the brushes 19, 20 and 21, respectively. The presence of these self-induction coils does not sensibly affect the power or the power factor of the machine, since the circuits comprised between the brushes would behave like condensers for the useful currents and for no other currents.

Figure 8:
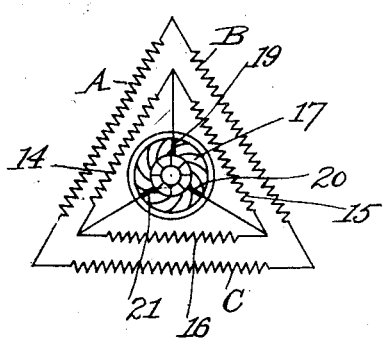

In the arrangement shown in Fig. 8 the direct current type winding 17 is also supposed to be placed directly on the rotor 8, and the self induction coils 14, 15, 16, are placed between the brushes 19, 21; 21, 20 and 21, 19, respectively.

From the foregoing it will be understood that in all induction machines the stator and rotor windings are generally very close to each other and the secondaries receive almost the whole flux generated by the primary winding. If therefore the secondary circuits are provided with high resistances which are free of self induction, outside of the machine, these would themselves dampen the harmonics. I may, therefore, in the construction shown in Figs. 4, 7 and 8, place equal and very high resistances without self induction in parallel with the self induction coils 14, 15, 16, and in the construction shown in Figs. 5 and 6, such resistances without self-induction may be placed between the brushes 19, 20; 20, 21, and 21, 19. While such arrangements would be effective in dampening the harmonics I prefer the use of the high resistance squirrel cage arrangement for mechanical reasons.

From the foregoing it will be understood that my invention is applicable to all kinds of alternating current generators and motors, including rotary converters, except to induction machines of the kind in which the secondary member is constituted by a low resistance squirrel cage.

I have attained excellent results by using an alternating current machine in which I have converted the ordinary inducing circuits into high-resistance harmonic-damper circuits by adding external resistance coils to each inducing circuit, which resistance coils each have an ohmic resistance of 75 times that of each inducing circuit, as it originally stood.

Having now fully described my invention I claim and desire to secure by Letters Patent:

1. An alternating current machine provided with an unscreened very high-resistance harmonic-damper circuit, substantially as described.

2. An alternating current machine having a harmonic-damper circuit made of a resistance sufficiently high to effectively suppress upper harmonics, as herein defined, and a winding in inductive proximity thereto of a self-induction which is made low for the low-frequency currents flowing therein but high for the currents of upper harmonic frequency, whereby the winding does not act as a screen for the damper, substantially as described.

3. A multipolar alternating current machine having certain poles supplied with high-resistance harmonic-damper circuits and other poles supplied with low resistance anti-hunting circuits, whereby the anti-hunting circuits do not screen the harmonic-damper circuits, substantially as described.

4. An alternating current machine supplied with a circuit of a resistance sufficiently high to effectively suppress the upper harmonics, as herein defined, substantially as described.

5. An alternating current machine supplied with a squirrel-cage circuit made of a resistance sufficiently high to effectively suppress the upper harmonics, as herein defined, substantially as described.

6. An alternating current machine supplied with a squirrel-cage circuit near the air gap of a resistance sufficiently high to effectively suppress the upper harmonics, as herein defined, substantially as described.

In testimony whereof I have signed my name to this specification.

MAURICE LEBLANC.

Witnesses:
ALBERT DELOS,
F. T. CHAPMAN.